US009442553B2

(12) United States Patent
Enohara et al.

(10) Patent No.: US 9,442,553 B2
(45) Date of Patent: Sep. 13, 2016

(54) INFORMATION PROCESSING APPARATUS, METHOD, AND COMPUTER READABLE MEDIUM TO CONTROL A TARGET DEVICE BASED ON DETECTION OF PEOPLE IN THE VICINITY OF THE TARGET DEVICE

(71) Applicant: Kabushiki Kaisha Toshiba, Tokyo (JP)

(72) Inventors: Takaaki Enohara, Tokyo (JP); Kazumi Nagata, Tokyo (JP); Shuhei Noda, Tokyo (JP); Kenji Baba, Tokyo (JP); Nobutaka Nishimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/820,034

(22) PCT Filed: Dec. 20, 2012

(86) PCT No.: PCT/JP2012/083150
§ 371 (c)(1),
(2) Date: Feb. 28, 2013

(87) PCT Pub. No.: WO2013/114761
PCT Pub. Date: Aug. 8, 2013

(65) Prior Publication Data
US 2014/0333766 A1    Nov. 13, 2014

(30) Foreign Application Priority Data
Jan. 30, 2012    (JP) ................. 2012-017145

(51) Int. Cl.
*H04N 7/18*    (2006.01)
*G06F 1/32*    (2006.01)
*H05B 37/02*    (2006.01)

(52) U.S. Cl.
CPC ............ *G06F 1/3231* (2013.01); *H04N 7/181* (2013.01); *H05B 37/029* (2013.01)

(58) Field of Classification Search
CPC ..................................... G06F 1/3231
USPC ........................................ 348/143
See application file for complete search history.

(56) References Cited

U.S. PATENT DOCUMENTS

| 5,586,254 A * | 12/1996 | Kondo et al. .................. 714/25 |
| 7,236,690 B2 * | 6/2007 | Matsukawa .................. 386/223 |
| 2011/0260654 A1 | 10/2011 | Tanigawa et al. |

FOREIGN PATENT DOCUMENTS

| CN | 202033568 U | 11/2011 |
| EP | 2 385 751 A2 | 9/2011 |

(Continued)

OTHER PUBLICATIONS
International Search Report with written opinion issued on Jan. 22, 2013 in PCT/JP2012/083150 filed Dec. 20, 2012.

(Continued)

*Primary Examiner* — Leron Beck
(74) *Attorney, Agent, or Firm* — Oblon, McClelland, Maier & Neustadt, L.L.P

(57) ABSTRACT

An information processing apparatus is communicatively connected to a plurality of image sensors that capture images of surroundings of a control target device which is to be a target of power controlling. The information processing apparatus includes an attribute information generation unit and a management unit. The attribute information generation unit generates, by using the images captured by each of the image sensors, attribute information of the control target device which is under jurisdiction of at least one of the image sensors. The management unit manages the attribute information of the control target device generated by the attribute information generation unit in association with the control target device and the at least one of the image sensors having jurisdiction over the control target device.

11 Claims, 18 Drawing Sheets

(56) References Cited

FOREIGN PATENT DOCUMENTS

| | | |
|---|---|---|
| EP | 2 410 822 A2 | 1/2012 |
| JP | 2002-289373 | 10/2002 |
| JP | 2008-243749 | 10/2008 |
| JP | 2008 243806 | 10/2008 |
| JP | 2009-238526 | 10/2009 |
| JP | 2010 39157 | 2/2010 |
| JP | 2010 162656 | 7/2010 |
| JP | 2011 108483 | 6/2011 |
| JP | 2011-228174 | 11/2011 |
| JP | 2012 524014 | 10/2012 |
| WO | 2011/073933 A2 | 6/2011 |

OTHER PUBLICATIONS

Office Action mailed Sep. 25, 2015 in Chinese Application No. 201280004384.3.

Extended European Search Report issued May 6, 2016 in Patent Application No. 12856581.9.

* cited by examiner

FIG.4

| ATTRIBUTE INFORMATION ⟨341 | | | | |
|---|---|---|---|---|
| SENSOR ID | IP ADDRESS | INSTALLATION POSITION | DETECTION AREA | DEVICE UNDER JURISDICTION |

FIG.5

| ATTRIBUTE INFORMATION ⟨342 | | | |
|---|---|---|---|
| DEVICE ID | INSTALLATION POSITION | SENSOR WITH JURISDICTION | DETECTION AREA |

| ATTRIBUTE INFORMATION ⟨341 | | | | |
|---|---|---|---|---|
| SENSOR ID | IP ADDRESS | INSTALLATION POSITION | DETECTION AREA | DEVICE UNDER JURISDICTION |
| 1001 | 192.168.0.1 | | | |
| ... | ... | | | |

FIG.12

| ATTRIBUTE INFORMATION ,341 | | | | |
|---|---|---|---|---|
| SENSOR ID | IP ADDRESS | INSTALLATION POSITION | DETECTION AREA | DEVICE UNDER JURISDICTION |
| 1001 | 192.168.0.1 | | A11 | 2001, 2002 |
| | | | A12 | 2003, 2004 |
| | | | A13 | 2005 |
| | | | A14 | 2006 |
| ... | ... | | ... | ... |

FIG.13

| ATTRIBUTE INFORMATION ,342 | | | |
|---|---|---|---|
| DEVICE ID | INSTALLATION POSITION | SENSOR WITH JURISDICTION | DETECTION AREA |
| 2001 | | 1001 | A11 |
| 2002 | | | A11 |
| 2003 | | | A12 |
| 2004 | | | A12 |
| 2005 | | | A13 |
| 2006 | | | A14 |
| ... | | ... | ... |

| ATTRIBUTE INFORMATION ||||| 341 |
|---|---|---|---|---|
| SENSOR ID | IP ADDRESS | INSTALLATION POSITION | DETECTION AREA | DEVICE UNDER JURISDICTION |
| 1001 | 192.168.0.1 | B-3 | A11 | 2001, 2002 |
| | | | A12 | 2003, 2004 |
| | | | A13 | 2005 |
| | | | A14 | 2006 |
| ... | ... | ... | ... | ... |

FIG.16

| ATTRIBUTE INFORMATION 342 | | | |
|---|---|---|---|
| DEVICE ID | INSTALLATION POSITION | SENSOR WITH JURISDICTION | DETECTION AREA |
| 2001 | B-1 | 1001 | A11 |
| 2002 | B-2 | | A11 |
| 2003 | B-4 | | A12 |
| 2004 | B-5 | | A12 |
| 2005 | B-6 | | A13 |
| 2006 | B-7 | | A14 |
| ... | ... | ... | ... |

FIG.17

| ATTRIBUTE INFORMATION | | | | | SETTING INFORMATION | | |
|---|---|---|---|---|---|---|---|
| SENSOR ID | IP ADDRESS | INSTALLATION POSITION | DETECTION AREA | DEVICE UNDER JURISDICTION | MASK AREA | DETECTION PARAMETER 1 | DETECTION PARAMETER 2 |
| 1001 | 192.168.0.1 | B-3 | A11 | 2001, 2002 | (10, 50), (110, 200) | 5 | 10 |
| ... | ... | ... | ... | ... | ... | ... | ... |

| ATTRIBUTE INFORMATION | | | SETTING INFORMATION | | | |
|---|---|---|---|---|---|---|
| DEVICE ID | INSTALLATION POSITION | SENSOR WITH JURISDICTION | DETECTION AREA | OUTPUT PARAMETER 1 | OUTPUT PARAMETER 2 | OUTPUT PARAMETER 3 |
| 2001 | B-1 | 1001 | A11 | 80 | 5 | 100 |
| ⋮ | ⋮ | ⋮ | ⋮ | ⋮ | ⋮ | ⋮ |

| ATTRIBUTE INFORMATION ,341 | | | | |
|---|---|---|---|---|
| SENSOR ID | IP ADDRESS | INSTALLATION POSITION | DETECTION AREA | DEVICE UNDER JURISDICTION |
| 1001 | 192.168.0.1 | B-3 | A11 | 2001, 2002 |
| | | | A12 | 2003, 2004 |
| | | | A13 | 2005 |
| | | | A14 | 2006 |
| 1002 | 192.168.0.2 | C-3 | A21 | 2011 |
| | | | A22 | 2012 |
| | | | A23 | 2013, 2014 |
| | | | A24 | 2015, 2016 |
| ... | ... | ... | ... | ... |

INFORMATION PROCESSING APPARATUS, METHOD, AND COMPUTER READABLE MEDIUM TO CONTROL A TARGET DEVICE BASED ON DETECTION OF PEOPLE IN THE VICINITY OF THE TARGET DEVICE

CROSS-REFERENCE TO RELATED APPLICATIONS

This application is national stage application of International Application No. PCT/JP2012/083150, filed Dec. 20, 2012, which designates the United States, incorporated herein by reference, and which claims the benefit of priority from Japanese Patent Application No. 2012-017145, filed Jan. 30, 2012, the entire contents of which are incorporated herein by reference.

FIELD

Embodiments described herein relate generally to an information processing apparatus, an information processing method, and a computer program product.

BACKGROUND

Conventionally, in buildings such as office buildings or tenant buildings, a sensing result of presence or absence of people is acquired by using an image captured by an image sensor. Then, in accordance with the sensing result, power controlling of electric devices such as lightings and air conditionings is performed. When such power controlling is performed, it is necessary to perform various settings by associating electric devices, which are to be the target of controlling, and image sensors, which have jurisdiction over the electric devices, with each other. However, such operation may become cumbersome due to an increase in the number of the electric devices and the image sensors. Accordingly, there has conventionally been proposed a technique to detect an installation position of a device (lightings) installed at the ceiling surface, by using a position detection device that detects the installation position by a reception level of a radio signal.

However, according to the conventional technique, it is necessary to prepare a dedicated device for specifying the installation position. Thus, there is a room for improvement in terms of efficiency in the setting operation.

BRIEF DESCRIPTION OF DRAWINGS

FIG. 4 is a diagram illustrating an example of a data structure of a sensor DB;

FIG. 5 is a diagram illustrating an example of a data structure of a device DB;

FIG. 12 is a diagram illustrating an example of a state of the sensor DB on which a process is performed by a device attribute generation unit;

FIG. 13 is a diagram illustrating an example of a state of the device DB on which a process is performed by the device attribute generation unit;

FIG. 16 is a diagram illustrating an example of a state of the sensor DB on which a process is performed by the installation position specifying unit;

FIG. 17 is a diagram illustrating another example of the sensor DB;

FIG. 18 is a diagram illustrating another example of the device DB;

FIG. 20 is a diagram illustrating an example of a sensor DB to which overlap information is added;

DETAILED DESCRIPTION

In general, according to one embodiment, an information processing apparatus is communicatively connected to a plurality of image sensors that capture images of surroundings of a control target device which is to be a target of power controlling. The information processing apparatus includes an attribute information generation unit and a management unit. The attribute information generation unit generates, by using the images captured by each of the image sensors, attribute information of the control target device which is under jurisdiction of at least one of the image sensors. The management unit manages the attribute information of the control target device generated by the attribute information generation unit in association with the control target device and the at least one of the image sensors having jurisdiction over the control target device.

Hereinafter, an image sensor system according to an embodiment of the invention will be described in detail with reference to the appended drawings. In the embodiment to be described below, there is described an example in which the image sensor system according to the invention is applied to a building such as an office building.

Figure 1:
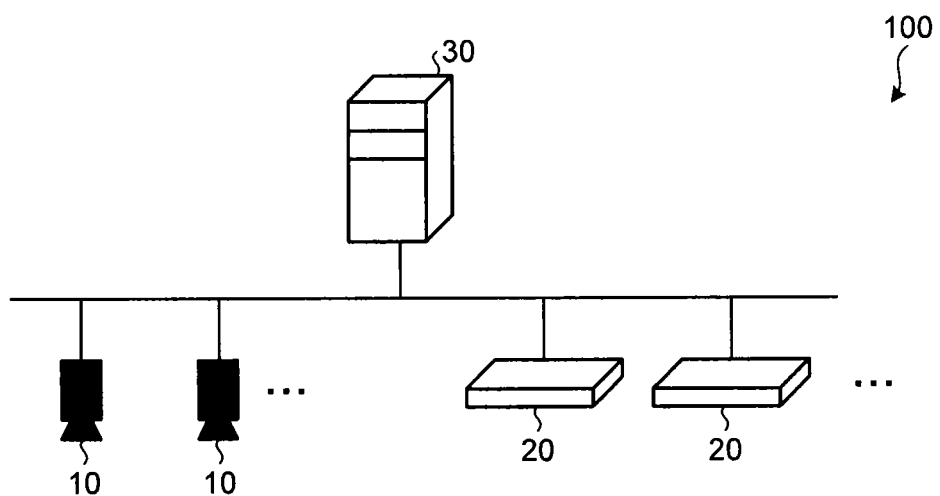
FIG. 1 is a diagram illustrating an example of a configuration of an image sensor system according to an embodiment.

FIG. 1 is a diagram illustrating an example of a configuration of an image sensor system 100 according to the embodiment. As illustrated in the figure, the image sensor system 100 includes image sensors 10, various electric devices 20, and a management terminal 30. Here, the management terminal 30 is detachably connected to each of the image sensors 10 or to a line to which each of the image sensors 10 are connected, and transmits and receives various kinds of information to and from each of the image sensors 10. Further, the management terminal 30 is detachably connected to each of the electric devices 20 or to a line to which each of the electric devices 20 are connected, and controls powering on and off, output values, and the like, of each of the electric devices 20. The number of image sensors 10 and the number of electric devices 20 are not particularly limited.

The image sensor 10 includes a camera unit configured by an image sensor or the like such as a CCD (Charge Coupled Device) or a CMOS (Complementary Metal Oxide Semiconductor) (none of which is illustrated), and captures an image of a space in which the electric device 20 is installed by using the camera unit. Further, the image sensor 10 has a computer configuration of a CPU (Central Processing Unit), a ROM (Read Only Memory), a RAM (Random Access Memory), and the like, and includes a non-volatile storage unit that stores various kinds of information and a communication unit that communicates with an external device such as the management terminal 30 (none of which is illustrated). The image sensor 10 detects presence/absence or the like of people by sensing an acquired image and outputs the detection result to an external device (the management terminal 30).

The electric device 20 is a control target device which is a target of power controlling, and an illumination device or an air-conditioning device is an example thereof.

Figure 2:
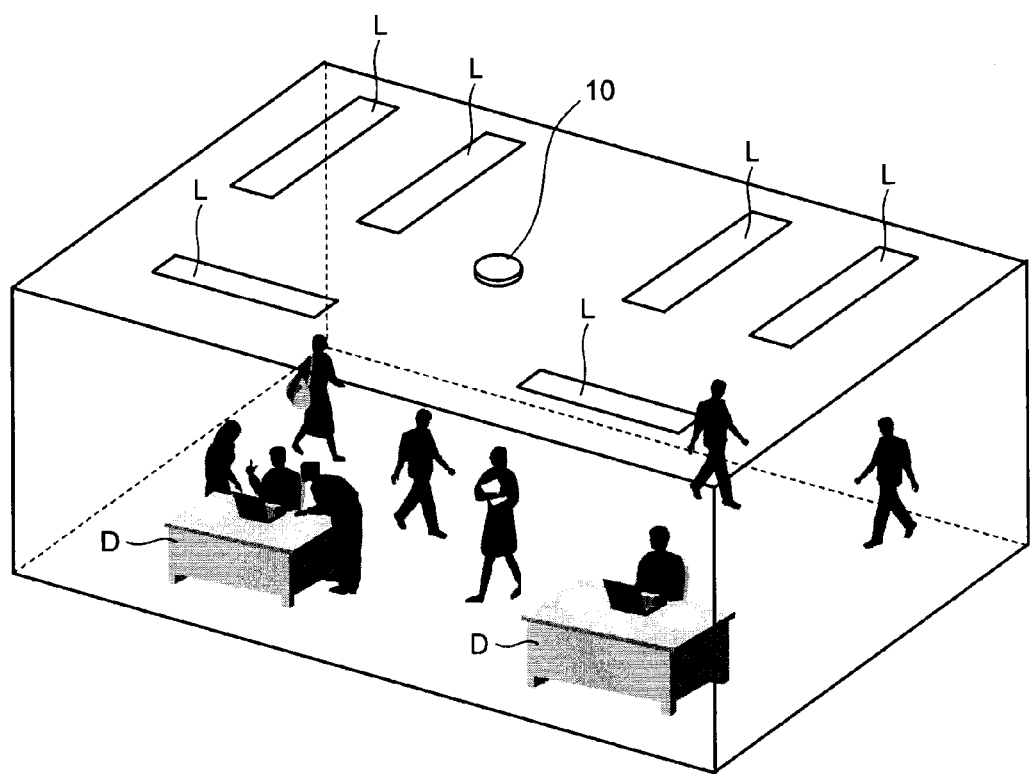
FIG. 2 is a diagram schematically illustrating an installation example of an image sensor and electric devices.

FIG. 2 is a diagram schematically illustrating an installation example of the image sensor 10 and the electric devices 20. In the figure, illumination devices L installed at the ceiling are illustrated as the electric devices 20. The image sensor 10 is installed at the ceiling as similar to the electric devices 20, and captures an image of a space from the ceiling to the surroundings of the electric devices 20. FIG. 2 illustrates an example in which two desks D are installed as objects in the room.

Here, in the image sensor system 100, a demand control unit 316 to be described below performs power controlling on the electric devices 20 based on a sensing result of the image sensor 10. For example, the demand control unit 316 performs control such that the electric device 20 (the illumination device L or the like) is turned on in an area, such as the surroundings of the desk D, in which people are present, and performs control such that the electric device 20 is turned off in an area in which people are absent (or an output is lowered). Further, when the density or an amount of activity of people is output as the sensing result of the image sensor 10, the demand control unit 316 performs control such that a light adjustment ratio of the illumination device is changed and the amount of wind of an air-conditioning device is changed, in accordance with the value. The density or the amount of activity of people is assumed to be calculated by using a known technique.

Here, when the above-described power controlling is performed, various kinds of information are required to be set in advance in each device of the image sensor 10 and the electric devices 20. The information of the image sensor 10 may include, for example, a sensor ID used to identify each image sensor 10, an IP address, an installation position in a building, and information of the electric device 20 which is under the jurisdiction of the image sensor 10. Further, the information of the electric device 20 may include, for example, a device ID used to identify each electric device 20, an installation position in the building, and information of the image sensor 10 which has jurisdiction over the electric device 20. Such information is stored in a database or the like, and is used for the power controlling of the electric device 20.

However, manual registration of the information in the database is cumbersome. In particular, when the installation position of the image sensor 10 or the electric device 20 is to be registered, a worker has to perform an operation in which the installation position and the layout drawing are associated with each other while visually confirming the actual device. Therefore, since it takes a considerable time, there is a problem of inefficiency.

Accordingly, the management terminal 30 according to this embodiment improves the efficiency of the operation for setting attribute information by: automatically generating an attribute information relevant to the above-described power controlling; and registering the attribute information in a predetermined data base. Here, in the attribute information, the image sensor 10 and the electric device 20 which is under the jurisdiction of this image sensor 10 are associated with each other based on each image captured by the image sensor 10. Hereinafter, the management terminal 30 will be described.

Figure 3:
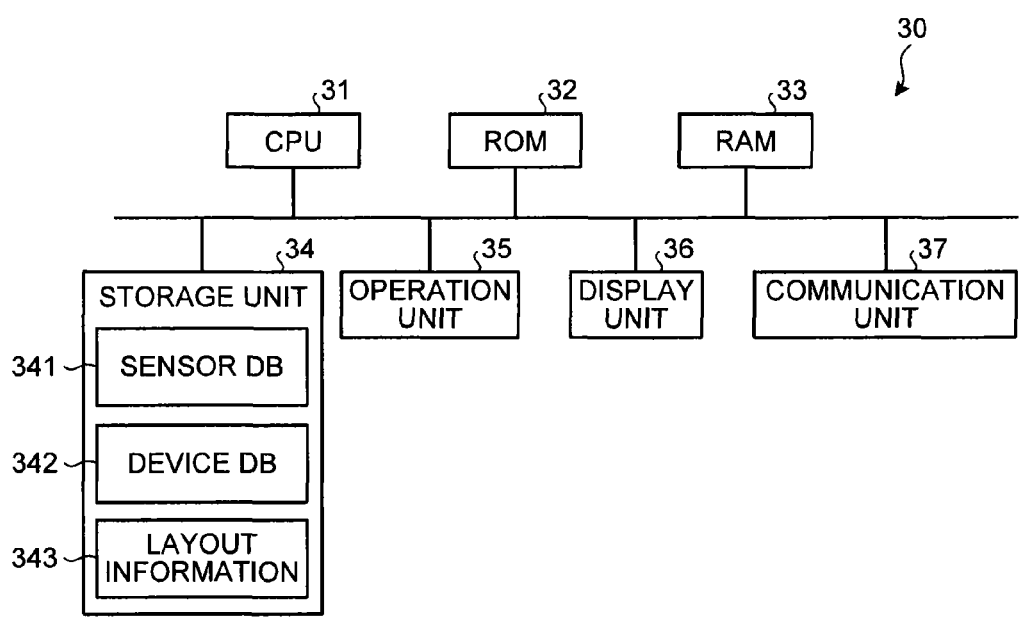
FIG. 3 is a block diagram illustrating an example of a hardware configuration of a management terminal according to the embodiment.

FIG. 3 is a block diagram illustrating an example of a hardware configuration of the management terminal 30. The management terminal 30 is an information processing apparatus such as a PC (Personal Computer) or a server device. As illustrated in FIG. 3, the management terminal 30 includes a CPU 31, a ROM 32, a RAM 33, a storage unit 34, an operation unit 35, a display unit 36, and a communication unit 37.

The CPU 31 generally controls a process of each unit of the management terminal 30 by loading a predetermined program stored in the ROM 32 or the storage unit 34 on the RAM 33 and executing the predetermined program. Further, the CPU 31 realizes each functional unit to be described below by loading a predetermined program stored in the ROM 32 or the storage unit 34 on the RAM 33 and executing the predetermined program.

The ROM 32 stores various programs to be executed by the CPU 31 and setting information. The RAM 33 is a main storage device and is used as a work memory of the management terminal 30.

The storage unit 34 is an auxiliary storage device such as an HDD (Hard Disk Drive), and stores various programs to be executed by the CPU 31 and setting information. Further, the storage unit 34 stores a sensor DB (DataBase) 341 that retains information on the image sensor 10, a device DB 342 that retains information of the electric device 20, and layout information 343.

FIG. 4 is a diagram illustrating an example of a data structure of the sensor DB 341. As illustrated in the drawing, the sensor DB 341 has, as the attribute information of the image sensor 10 relevant to the power controlling, entry fields in which information on a sensor ID, an IP address, an installation position, a detection area, a device under jurisdiction, and the like is stored. Here, an identifier used to identify each image sensor 10 is registered in the field of the "sensor ID," an IP address to which each image sensor 10 is assigned is registered in the field of the "IP address," and the installation position of the image sensor 10 in the building is registered in the field of the "installation position." Further, a region (area) in which each image sensor 10 is sensed is registered in the field of the "detection area" and an identifier (device ID) of the electric device 20 under the jurisdiction in the detection area is registered in the field of the "device under jurisdiction."

FIG. 5 is a diagram illustrating an example of a data structure of the device DB 342. As illustrated in the drawing, the device DB 342 has, as the attribute information of the electric device 20 relevant to the power controlling, entry fields in which information on a device ID, an installation position, a sensor with jurisdiction, the detection area, and the like is stored. Here, an identifier used to identify each electric device 20 is registered in the field of the "device ID" and the installation position of the electric device 20 in the building is registered in the field of the "installation position." Further, the sensor ID of the image sensor 10 having jurisdiction over each electric device 20 is registered in the field of the "sensor with jurisdiction" and the detection area in which the electric device 20 is placed in the image sensor 10 having jurisdiction over the electric device 20 is registered in the field of the "detection area."

Figure 7:
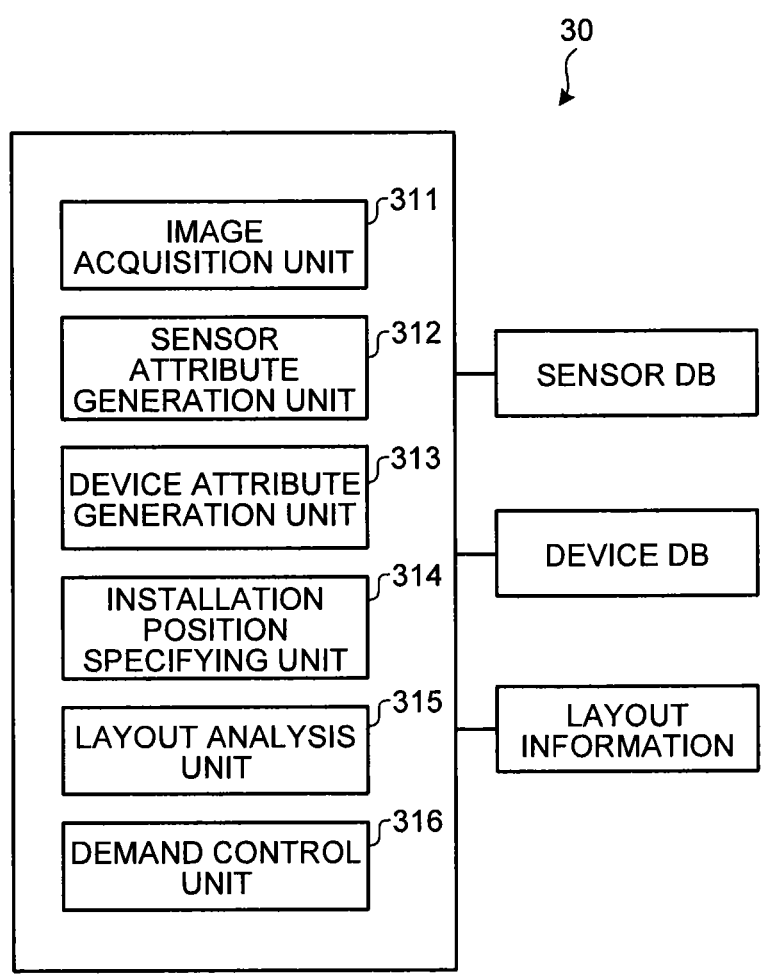
FIG. 7 is a block diagram illustrating an example of a functional configuration of the management terminal according to the embodiment.

The attribute information registered in the sensor DB 341 and the device DB 342 is automatically generated by a function of each functional unit (a sensor attribute generation unit 312, a device attribute generation unit 313, and an installation position specifying unit 314, see FIG. 7) to be described below, and is registered in the corresponding entry fields.

Figure 6:
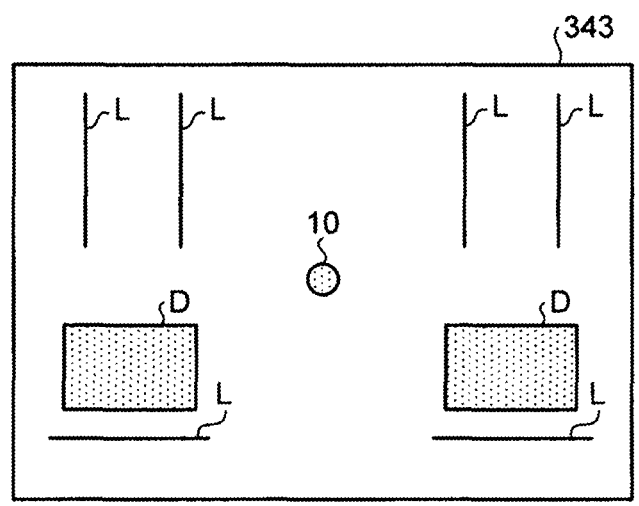
FIG. 6 is a diagram schematically illustrating an example of layout information.

FIG. 6 is a diagram schematically illustrating an example of the layout information 343. As illustrated in the figure, the layout information 343 is information such as CAD (Computer Aided Design) data indicating the layout (design drawing) of each room in which the image sensor 10 and the electric devices 20 (illumination device L) are installed. The layout information is assumed to include: the layouts of the image sensor 10, the electric devices 20, and various objects (walls, windows, doors, desks D, and the like) installed indoors; and positional information (for example, a floor number, a room number, a position code, and coordinates) indicating the absolute position in the building.

Referring back to FIG. 3, the operation unit 35 is an input device such as a keyboard or a mouse, and outputs an input operation received from a user of the management terminal 30 to the CPU 31. The display unit 36 is a display device such as an LCD (Liquid Crystal Display), and displays characters, images, or the like under the control of the CPU 31. The communication unit 37 is a network interface, and transmits and receives various kinds of information to and from the image sensor 10 connected via a network such as a LAN (Local Area Network) under the control of the CPU 31.

Next, a functional configuration of the management terminal 30 will be described. FIG. 7 is a block diagram illustrating an example of the functional configuration of the management terminal 30. As illustrated in the drawing, the management terminal 30 includes an image acquisition unit 311, a sensor attribute generation unit 312, a device attribute generation unit 313, an installation position specifying unit 314, a layout analysis unit 315, and a demand control unit 316, as functional units realized by cooperation of the CPU 31 and a predetermined program.

The image acquisition unit 311 sequentially acquires images captured by the image sensors 10 via a network (not illustrated). An IP address used to communicate with each image sensor 10 may be assigned in advance to each image sensor 10. Alternatively, an IP address may be assigned to each image sensor 10 using a technique such as DHCP.

The sensor attribute generation unit 312 recognizes a character string indicating the attribute information from an image of the image sensor 10 acquired by the image acquisition unit 311 by analyzing the image. Further, the sensor attribute generation unit 312 registers the recognized character string in a corresponding entry field of the sensor DB 341 as the attribute information.

Figures 8, 9:
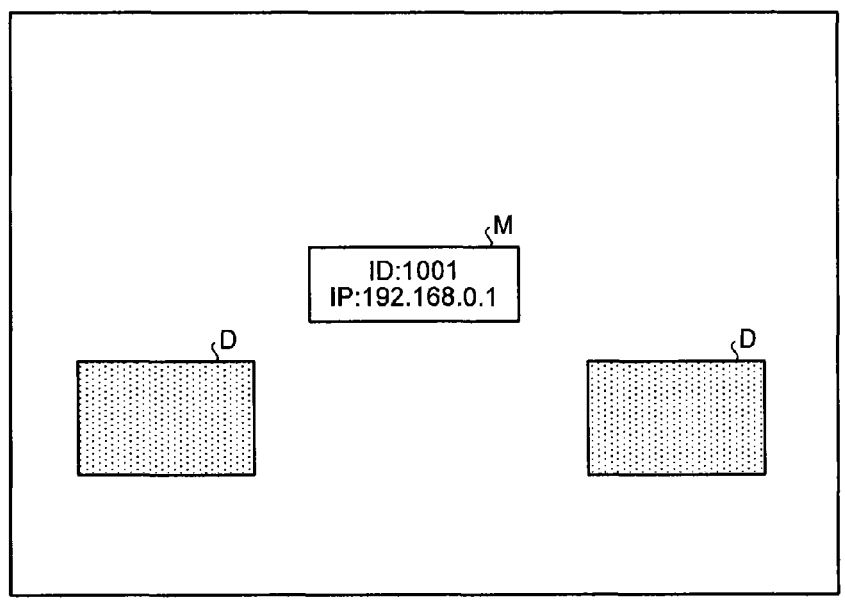
FIG. 8 is a diagram illustrating an example of an image captured by an image sensor.
FIG. 9 is a diagram illustrating an example of a state of the sensor DB on which a process is performed by a sensor attribute generation unit.

Next, a process of the sensor attribute generation unit 312 will be described with reference to FIGS. 8 and 9. First, a marker writing down the sensor ID and the IP address of the image sensor 10 is presented within an imaging range (for example, a range immediately below the image sensor 10) of the image sensor 10 to be set. At this time, the image sensor 10 acquires an image including the marker M by capturing an image of the imaging range, as illustrated in FIG. 8. Here, FIG. 8 is a diagram illustrating an example of an image captured by the image sensor 10.

The sensor attribute generation unit 312 recognizes the character strings "sensor ID: 1001" and "IP address: 192.168.0.1" described in the marker M in the image as the character strings indicated by the attribute information by analyzing the image of FIG. 8. A describing method on the marker and the described contents are not particularly limited, but it is preferable to describe a pair of an entry name (the sensor ID, the IP address, and the like) of the attribute information and the contents of the entry name. Further, the character recognition is performed according to a known technique.

Then, the sensor attribute generation unit 312 registers the character strings "sensor ID: 1001" and "IP address: 192.168.0.1" recognized from the image of FIG. 8 in corresponding entry fields of the sensor DB 341. Specifically, "1001" is registered in the "sensor ID" field of the sensor DB 341 and "192.168.0.1" is registered in the "IP address" field thereof.

FIG. 9 is a diagram illustrating an example of a state of the sensor DB 341 on which the process is performed by the sensor attribute generation unit 312. As illustrated in the drawing, the sensor ID and the IP address are registered by the sensor attribute generation unit 312. Thus, the sensor ID and the IP address are registered in association with each other for the same image sensor 10.

In this example, the IP address recognized from the image is registered in the sensor DB 341, but the IP address acquired at the time of the communication with the image sensor 10 may be registered in the sensor DB 341. Further, the IP address may be used as the sensor ID. When the IP address assigned to the image sensor 10 is different from the IP address described in the marker, the IP address is updated to the IP address described in the marker.

The attribute information described in the marker is not limited to the above-described entries, but other entries may be described. Further, when the sensor attribute generation unit 312 has a decode function of decoding a code symbol such as a barcode or a two-dimensional code, the code symbol in which the attribute information is retained may be presented instead of the maker in which the characters are described.

Referring back to FIG. 7, the device attribute generation unit 313 detects an image in which a change occurs from the images of the respective image sensors 10 obtained when the electric devices 20 are operated, and then specifies the image sensor 10 capturing this image as an image sensor with jurisdiction over the operated electric device 20. Further, the device attribute generation unit 313 registers a relationship between the image sensor 10 and the electric device 20 that is under jurisdiction of this image sensor 10 as attribute information, in the sensor DB 341 and the device DB 342.

Hereinafter, a process of the device attribute generation unit 313 will be described with reference to FIGS. 10 to 13.

First, the device attribute generation unit 313 turns on the power of the electric devices 20 installed in the building one by one via control lines (not illustrated), and assigns unique device IDs to the powered-on electric devices 20. Further, the device attribute generation unit 313 detects images in which a change occurs when the electric devices 20 are turned on among images captured by the respective image sensors 10. Then, when the device attribute generation unit 313 detects the images in which the change occurs, the device attribute generation unit 313 determines that the powered-on electric device 20 is under jurisdiction of the image sensor 10 capturing the image.

For example, when the electric device 20 is an illumination device, the device attribute generation unit 313 detects a change in luminance in the image by comparing images obtained before and after the target illumination device is turned on, and detects an image in which the amount of change is greater than a predetermined threshold value. When the electric device 20 is an air-conditioning device, a streamer or the like is attached to a supply opening of the air-conditioning device, and then the device attribute generation unit 313 detects a swing motion of the streamer from the image obtained after the target air-conditioning device is turned on, and specifies an image in which the amount of motion is greater than a predetermined threshold value. Further, after detecting the image in which the change occurs, the device attribute generation unit 313 turns off the powered-on electric device 20, and then the process proceeds to the subsequent process of the electric device 20.

The device attribute generation unit 313 specifies a relative positional relationship of the powered-on electric device 20 with respect to the image sensor 10 from a change state in the detected image.

Figure 10:
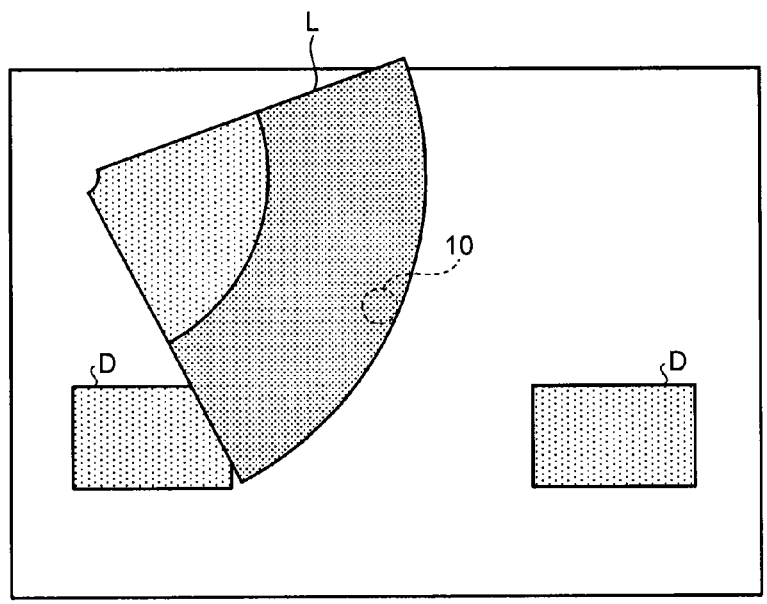
FIG. 10 is a diagram illustrating an example of an image captured by the image sensor.

For example, as illustrated in FIG. 10, when the electric device 20 is an illumination device L, the device attribute generation unit 313 specifies a relative positional relationship (the distance and direction) of the illumination device L with respect to the image sensor 10 by analyzing the distribution (luminance distribution) of light in the image. Here, FIG. 10 is a diagram illustrating an example of the image captured by the image sensor 10. In case of the figure, for example, the device attribute generation unit 313 specifies that the target electric device 20 is present at a position away by the distance of 6 m in the 10 o'clock direction from the installation position (indicated by a dashed line in the figure) of the image sensor 10.

When the electric device 20 is an air-conditioning device, the device attribute generation unit 313 can specify a relative positional relationship (the distance and direction) of the air-conditioning device with respect to the image sensor 10 from the position at which the streamer attached to the air-conditioning device swings.

The device attribute generation unit 313 divides the detection area of the image sensor 10 based on the specified relative positional relationship of each electric device 20 with respect to the image sensor 10, and assigns an area number to each of the divided detection areas.

Figure 11:
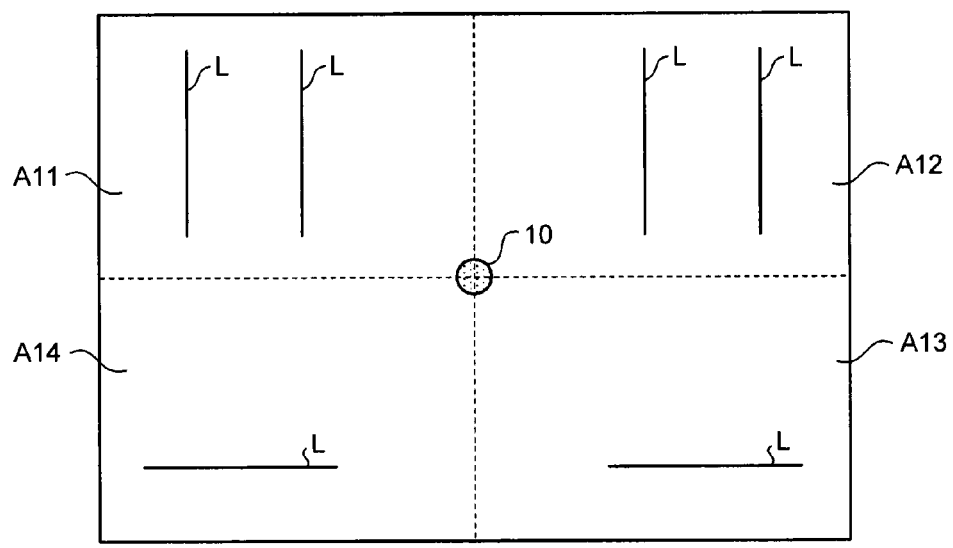
FIG. 11 is a diagram illustrating an example of division of a detection area.

For example, as illustrated in FIG. 11, when two illumination devices L are present in the left upper area, two illumination devices L are present in the right upper area, one illumination device L is present in the right lower area, and one illumination device L is present in the left lower area with respect to the image sensor 10, the device attribute generation unit 313 divides the detection area into four detection areas indicated by dashed lines and assigns area numbers (A11 to A14) to the divided detection areas. Here, FIG. 11 is a diagram illustrating an example of the division of the detection area.

Then, the device attribute generation unit 313 assigns the device ID of the powered-on electric device 20 to the corresponding detection area, and registers the device ID in the sensor DB 341 in association with the sensor ID of the image sensor 10 having jurisdiction over this electric device 20. Further, the device attribute generation unit 313 registers the device ID assigned to each electric device 20 in the device DB 342, and registers the sensor ID of the image sensor 10 having jurisdiction over this electric device 20 and the area number assigned to the electric device 20 in the device DB 342 in association with this device ID.

Here, FIG. 12 is a diagram illustrating an example of a state of the sensor DB 341 on which the process is performed by the device attribute generation unit 313. As illustrated in the figure, the device ID of the electric device 20 under the jurisdiction is registered in the field of the "device under jurisdiction" in association with the sensor ID of each image sensor 10 for each detection area (area number) of this image sensor 10 through the process of the device attribute generation unit 313.

FIG. 13 is a diagram illustrating an example of a state of the device DB 342 on which the process is performed by the device attribute generation unit 313. As illustrated in the figure, the sensor ID of the image sensor 10 with jurisdiction over the electric device 20 and the detection area (area number) in which the electric device 20 is present are respectively registered in the fields of the "sensor with jurisdiction" and the "detection area" in association with the device ID of each electric device 20 through the process of the device attribute generation unit 313.

In this embodiment, the detection area of the image sensor 10 has been divided into the plurality of areas, but the invention is not limited thereto. The detection area may not be divided. In this embodiment, the device attribute generation unit 313 has turned on/off the electric devices 20, but the invention is not limited thereto. A worker may manually turn on/off the electric devices.

The installation position specifying unit 314 recognizes objects such as walls, windows, doors, or desks from images captured by the respective image sensors 10, and acquires a disposition relation (layout) of the objects. Here, a method of recognizing the objects is not particularly limited and a known technique can be used. For example, an object discrimination model may be generated by collecting images obtained by imaging a general office space and performing a learning based on the images, and objects may be recognized from actually captured images using the object discrimination model. Further, edge detection may be performed from images, the boundaries of the walls, floors, ceilings of a building may be extracted, and thus a disposition relation of the objects may be recognized.

The installation position specifying unit 314 checks the layout information 343 of the respective rooms using the layout acquired from the images of the image sensor 10 and the relative positional relationship of the electric devices 20 specified by the device attribute generation unit 313 with respect to this image sensor 10, and then retrieves layout information having a similar layout.

Here, in similarity retrieval, for example, a disposition relation of indoor objects or the electric devices 20 indicated by the layout information is extracted as a feature amount, the degree of similarity is calculated based on the extracted feature amount, and layout information with the highest similarity is acquired. Further, the layout information with the high similarity may be presented before a worker, and the worker selects the layout information matching actual layout information.

Figures 14, 15:
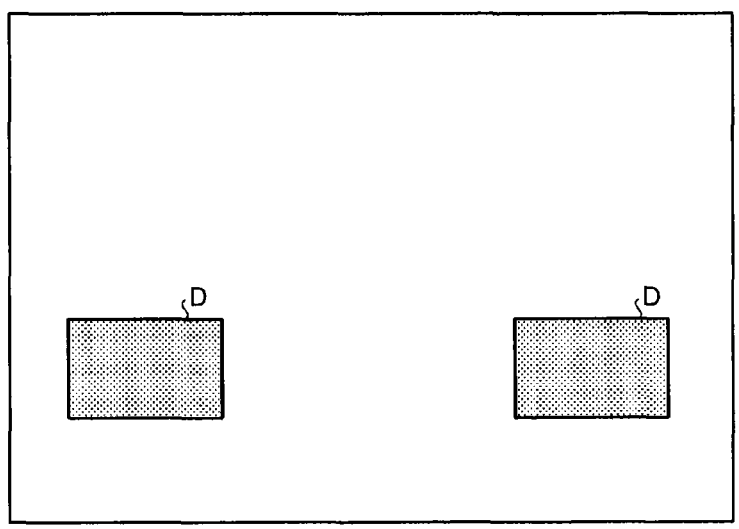
FIG. 14 is a diagram for explaining an operation of an installation position specifying unit.
FIG. 15 is a diagram illustrating an example of a state of the sensor DB on which a process is performed by the installation position specifying unit.

For example, the layout acquired from an image is assumed to be the layout of desks D illustrated in FIG. 14, and the relative positional relationship between the image sensor 10 which has captured this image and the electric devices 20 under jurisdiction of the this image sensor 10 is assumed to be the state illustrated in FIG. 11. In this case, the installation position specifying unit 314 sets a pair of the layouts illustrated in FIGS. 14 and 11 as a retrieval condition, and retrieves the layout information corresponding (similar) to the retrieval condition. Then, the device attribute generation unit 313 acquires the layout information of FIG. 6 corresponding to the retrieval condition.

When the installation position specifying unit 314 specifies the installation positions of the image sensor 10 and each electric device 20 installed in the room from the acquired layout information, the installation position specifying unit 314 registers the specified installation position of the image sensor 10 in association with the corresponding sensor ID of the sensor DB 341, and registers the specified installation position of the electric device 20 in association with the corresponding device ID of the device DB 342.

Here, FIG. 15 is a diagram illustrating an example of a state of the sensor DB 341 on which the process is performed by the installation position specifying unit 314. As illustrated in the figure, the installation position of each image sensor 10 is registered in the "installation position" field in association with the sensor ID of the image sensor 10 through the process of the installation position specifying unit 314.

FIG. 16 is a diagram illustrating an example of a state of the device DB 342 on which the process is performed by the installation position specifying unit 314. As illustrated in the figure, the installation positions of the electric devices 20 are registered in the "installation position" field in association with the device IDs of the electric devices 20 through the process of the installation position specifying unit 314.

The attribute information of the sensor DB 341 and the device DB 342 is generated by the functions of the image acquisition unit 311, the sensor attribute generation unit 312, the device attribute generation unit 313, and the installation position specifying unit 314. Further, the information registered in the sensor DB 341 and the device DB 342 is not limited to the above-described attribute information, but may include a manually input entry. For example, a threshold value relevant to the sensing of the image sensor 10, an output level of the electric device 20, and the like may be registered as setting information relevant to control of each of the image sensors 10 and the electric devices 20.

Here, FIG. 17 is a diagram illustrating another example of the sensor DB 341 with which the setting information of each image sensor 10 is integrated. The figure illustrates an example in which a mask area, various parameters (detection parameters 1 and 2) such as a threshold value or the like relevant to the sensing, and the like are registered as the setting information of the image sensor 10. The mask area indicates an area excluded from sensing target areas among the detection areas of the image sensor 10. For example, when the mask area is a rectangle, as illustrated in FIG. 17, the coordinates of the diagonal points of the rectangle are registered.

FIG. 18 is a diagram illustrating another example of the device DB 342 with which the setting information of each electric device 20 is integrated. In the figure, for example, various parameters (output parameters 1, 2, and 3) such as a normal output value, a lower-limit output value, an upper-limit value are registered as the setting information of the electric device 20. Such setting information is used when the power controlling of the electric device 20 is performed.

Referring back to FIG. 7, the layout analysis unit 315 determines whether detection areas between the plurality of image sensors 10 overlap each other based on the identity of the device IDs associated with the detection areas of the respective image sensors 10, referring to the sensor DB 341.

Figure 19:
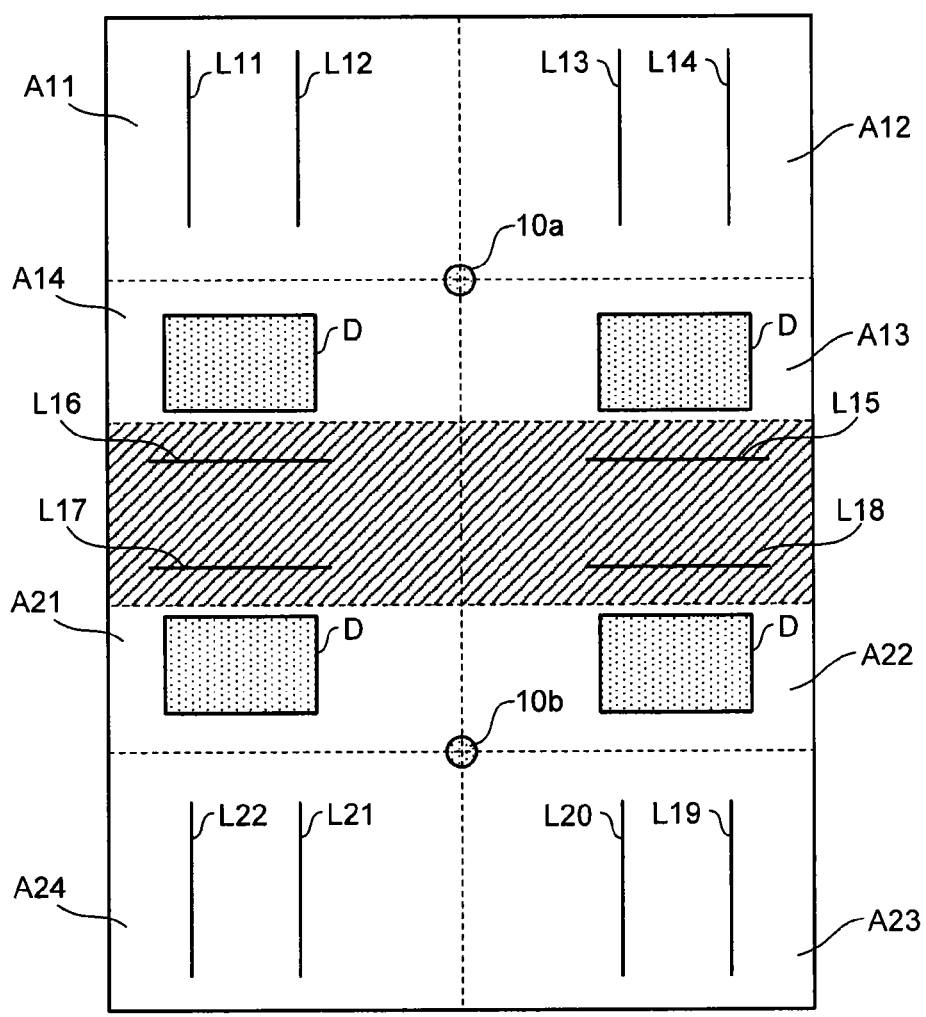
FIG. 19 is a diagram schematically illustrating an example of a layout of image sensors and electric devices.

For example, when the plurality of image sensors 10 (10*a* and 10*b*) are arranged within the same floor, as illustrated in FIG. 19, detection areas between the adjacent image sensors 10*a* and 10*b* overlap each other in some cases. In FIG. 19, among detection areas A11 to A14 of the image sensor 10*a* and detection areas A21 to A24 of the image sensor 10*b*, the detection areas A13 and A22 overlap each other and the detection areas A14 and A21 overlap each other (see hatching areas).

When the layout analysis unit 315 determines that the detection areas overlap each other, the overlap state is resolved by distributing each of the device IDs of the electric device 20 associated with the overlapping detection areas to one of the image sensors 10 which are under the overlapping relationship, and by reflecting the distribution result to the sensor DB 341 and the device DB 342. Here, a method of distributing the electric devices 20 is not particularly limited. For example, in the state of FIG. 19, among the illumination devices L11 to L22, the illumination devices L15 and L16 closer to the image sensor 10*a* may be set to be under jurisdiction of the image sensor 10*a*, and the illumination devices L17 and L18 closer to the image sensor 10*b* may be set to be under jurisdiction of the image sensor 10*b*. Here, the illumination devices L15, L16, L17, and L18 are present in the detection areas A13 (A22) and A14 (A21). Further, all of the illumination devices L15 to L18 present in the overlap detection areas may be set to be under jurisdiction of one of the image sensors 10.

Furthermore, by setting the overlap detection areas without change, both the image sensors 10*a* and 10*b* may be configured to sense the overlap detection areas. In this case, when presence of people is detected by one of the image sensors 10, the detection result is used. However, when presence of people is detected by both image sensors 10, the result may be configured to be used. When the electric devices 20 are controlled based on a pair of both sensing results, the layout analysis unit 315 adds overlap information to the overlap detection areas in the sensor DB 341 to instruct the control target (see FIG. 20).

Here, FIG. 20 is a diagram illustrating an example of the sensor DB 341 in which the overlap information is added. The figure illustrates an example in which the sensor ID of the image sensor 10*a* illustrated in FIG. 19 is set to "1001" and the sensor ID of the image sensor 10*b* is set to "1002." As illustrated in the figure, an example is schematically illustrated in which the overlap information OL is added to each of the detection areas A13 and A22 having the overlap relation and the detection areas A14 and A21 having the overlap relation among the detection areas of the image sensors 10*a* and 10*b*.

In this embodiment, the layout analysis unit 315 has determined whether the detection areas between the image sensors 10 overlap each other based on the identity of the device IDs associated with the detection areas of the respective image sensors 10, but the invention is not limited thereto. For example, the image sensors 10 having an adjacent relation may be specified from the layout information 343 and it may be determined that the detection areas of the image sensors 10 having the adjacent relation overlap each other.

Referring back to FIG. 7, the demand control unit 316 performs the power controlling according to the sensing result input from each of the image sensors 10 on each of the electric devices 20 under jurisdiction of the corresponding image sensors 10, referring to the sensor DB 341 and the device DB 342. Specifically, when the sensing results are input from the image sensors 10, the demand control unit 316 specifies which detection areas are associated with the sensing results, and extracts the device IDs of the electric devices 20 associated with the detection area from the sensor DB 341. Further, the demand control unit 316 controls the outputs of the electric devices 20 associated with the extracted device IDs according to the sensing results of the image sensors 10.

When the overlap information is added to the specified detection areas, the sensing results of the other image sensor 10 to which the overlap information is added are acquired, and the electric devices 20 under jurisdiction are controlled based on the pair of both the sensing results.

Figure 21:
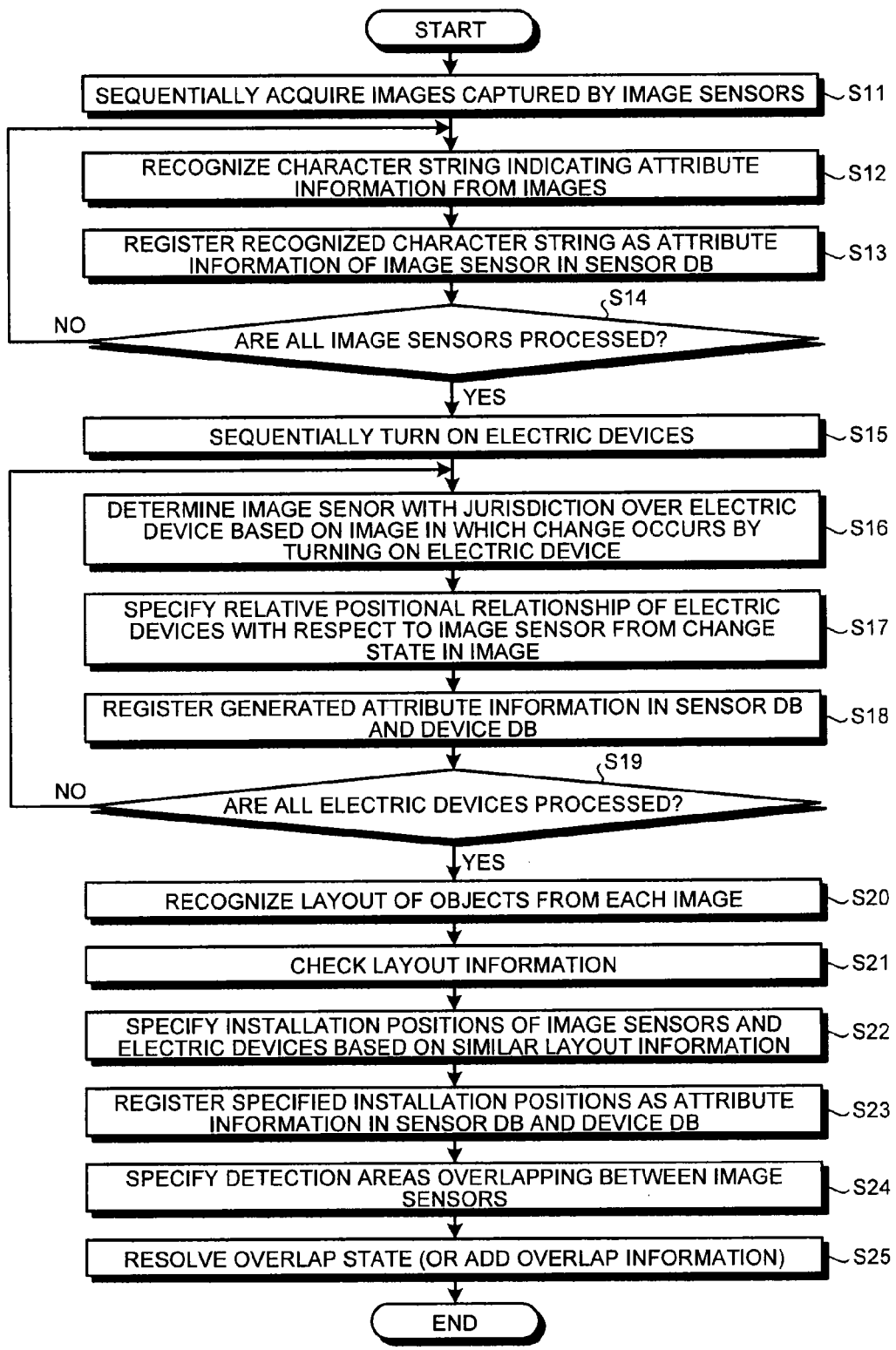
FIG. 21 is a flowchart illustrating an example of a DB generation process performed by a management terminal according to the embodiment.

Next, a process of the management terminal 30 will be described with reference to FIG. 21. Here, FIG. 21 is a flowchart illustrating an example of a DB generation process performed by the management terminal 30.

First, the image acquisition unit 311 sequentially acquires the images captured by the image sensors 10 (step S11). The process of step S11 is continuously performed during subsequent steps S12 to S25.

The sensor attribute generation unit 312 recognizes the character string indicating the attribute information from the images acquired by the image acquisition unit 311 (step S12). Next, the sensor attribute generation unit 312 registers the character string recognized in step S12 as the attribute information in the corresponding entry field of the sensor DB 341 (step S13).

Subsequently, the sensor attribute generation unit 312 determines whether the processes of steps S12 and S13 are performed on all of the installed image sensors 10 (step S14). Here, when the unprocessed image sensor 10 is present (No in step S14), the process returns to step S12. Conversely, when it is determined that the processes of steps S12 and S13 are performed on all of the image sensors 10 (Yes in step S14), the process proceeds to step S15.

In subsequent step S15, the device attribute generation unit 313 sequentially turns on the electric devices 20 (step S15). When the device attribute generation unit 313 detects an image in which a change occurs in the process of step S15 among the images acquired by the image acquisition unit 311, the device attribute generation unit 313 determines that the image sensor 10 having captured this image is the image sensor having jurisdiction over the powered-on electric devices 20 (step S16).

Then, the device attribute generation unit 313 specifies the relative positional relationship of the powered-on electric devices 20 with respect to the image sensor 10 from the change in a state in the image detected in step S16 (step S17). Subsequently, the device attribute generation unit 313 registers the attribute information generated based on the processing results of steps S16 and S17 in the corresponding entry fields of the sensor DB 341 and the device DB 342 (step S18).

Subsequently, the device attribute generation unit 313 determines whether the processes of steps S16 to S18 are performed on all of the electric devices 20 (step S19). Here, when the unprocessed electric device 20 is present (No in step S19), the process returns to step S16. Conversely, when it is determined that the processes of steps S16 to S18 are performed on all of the electric devices 20 (Yes in step S19), the process proceeds to step S20.

In subsequent step S20, the installation position specifying unit 314 recognizes the layout of objects from each image acquired by the image acquisition unit 311 (step S20). Subsequently, the installation position specifying unit 314 checks the layout information 343 using a pair of the layout recognized from each image and the relative positional relationship of the electric devices 20 of the image sensor 10 of this image, and retrieves the layout information having a similar layout (step S21). Next, when the installation position specifying unit 314 specifies the installation positions of the image sensor 10 and the electric devices 20 based on the similar layout information which is the retrieval result (step S22), the installation position specifying unit 314 registers the installation positions as the attribute information in the corresponding entry fields of the sensor DB 341 and the device DB 342 (step S23).

Subsequently, the layout analysis unit 315 specifies the detection areas overlapping each other between the image sensors 10 based on the identity of the device IDs associated with the detection areas of the respective image sensors 10 (step S24). Then, the layout analysis unit 315 resolves the overlap state by distributing the device IDs of the electric devices 20 associated with the overlap detection areas between the image sensors 10 having the overlap relation (step S25), and then this process ends. Further, when the overlap information is configured to be added, the overlap information is added to the overlap detection areas in step S25 instead of the resolution of the overlap state.

As described above, the management terminal 30 according to this embodiment generates the attribute information in which the image sensor 10 is associated with the electric device 20 which is under jurisdiction of the image sensors 10 by using images captured by each image sensors 10, and then registers the attribute information in the corresponding entry fields of the sensor DB 341 and the device DB 342. Thus, since the attribute information associated with the power controlling of the electric devices 20 can be automatically generated from the images captured by the image sensors 10, the attribute information can be efficiently set.

When the change in the image may not be confirmed by turning on the electric device 20 in the DB generation process, it may be determined that this electric device 20 is not under jurisdiction of the image sensor 10 and this electric device 20 may be associated with another sensor device located in the surroundings of this electric device 20.

Figure 22:
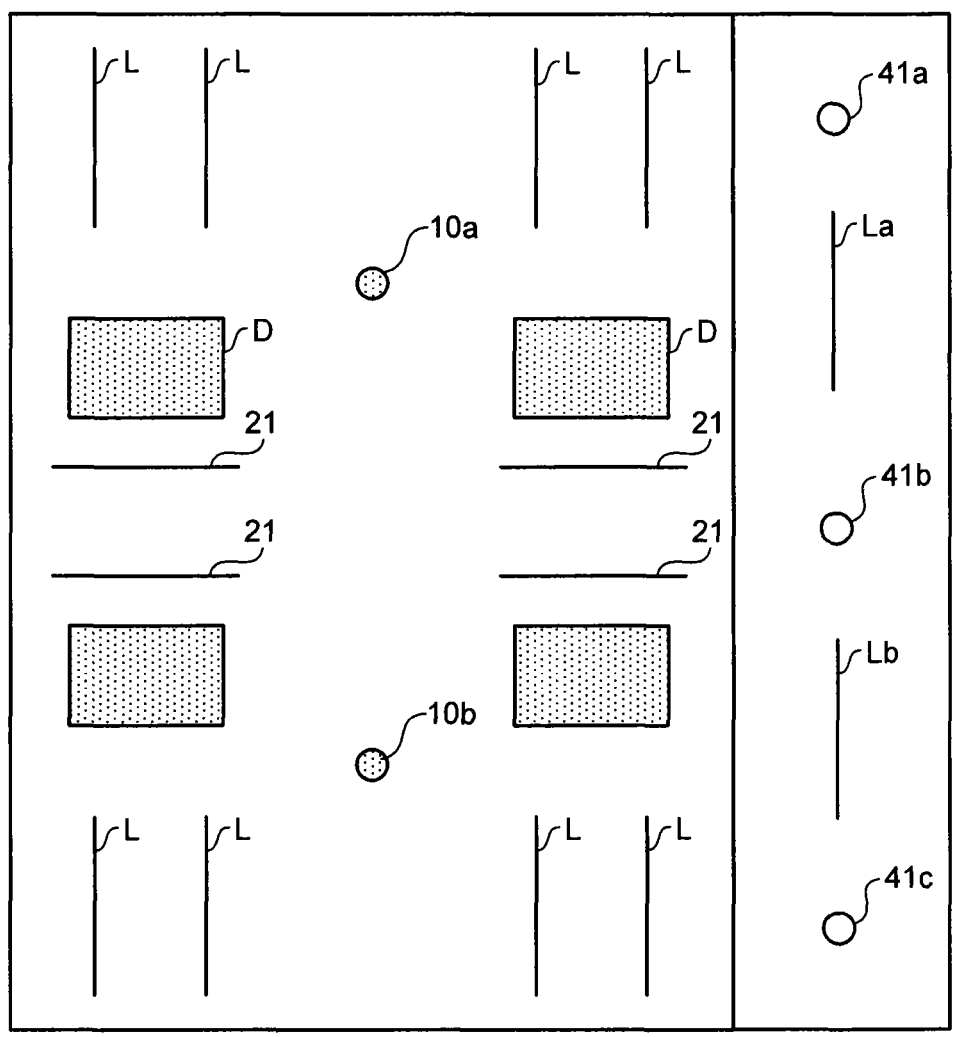
FIG. 22 is a diagram schematically illustrating an example of a layout of image sensors and electric devices.

For example, when illumination devices La and Lb are installed in a place (for example, a passage or the like) out of the room in which the image sensors 10 (10a and 10b) are installed, as illustrated in FIG. 22, the change on the image is not confirmed in spite of the fact that the illumination devices La and Lb are turned on.

In this case, the device attribute generation unit 313 determines that the illumination devices La and Lb for which the change on the image is not confirmed are under jurisdiction of a sensor device (an infrared sensor 41a, 41b, or 41c) other than the image sensors 10, after completing the generation of the attribution information on each of the image sensors 10, causes the sensor ID of the infrared sensor 41a, 41b, or 41c to correspond to the device IDs of the illumination devices La and Lb, and registers the sensor ID and the device IDs in the sensor DB 341 and the device DB 342.

In this case, the infrared sensor 41*a*, 41*b*, or 41*c* may be registered in the sensor DB 341 in advance or may be manually input by an operator each time. Further, the sensor ID or the IP address of the infrared sensor 41*a*, 41*b*, or 41*c* may be configured to be automatically assigned by the device attribute generation unit 313 or may be configured to be set manually by the operator.

The embodiment of the invention has been described above. The above-described embodiment is suggested as an example, and thus the scope of the invention is not intended to be limited. The above-described embodiment may be achieved in various other ways, and omissions, substitutions, changes, additions, or the like may be made variously within the scope of the invention without departing from the gist of the invention. Further, the above-described embodiment or the modifications are included in the scope or the gist of the invention and are included in the equivalent scope of the invention described in the claims.

For example, in the above-described embodiment, the attribute information has sequentially been generated for the image sensors 10 and the electric devices 20 and have been registered in the sensor DB 341 and the device DB 342, but the invention is not limited thereto. In the step of registering the attribute information for some of the image sensors 10 and the electric devices 20, the attribute information of the other image sensor 10 and the other electric devices 20 may be configured to be generated using the attribute information. Hereinafter, this configuration will be described as a modification example of the above-described embodiment with reference to FIGS. 19 and 23.

Figure 23:
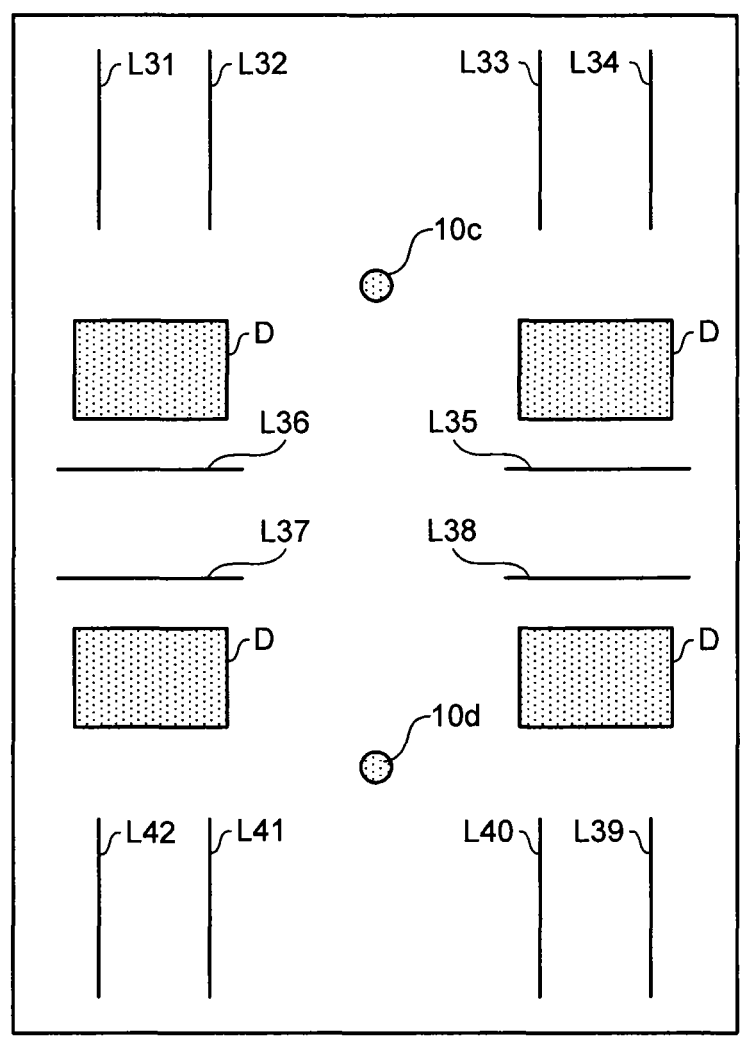
FIG. 23 is a diagram schematically illustrating an example of a layout of image sensors and electric devices.

As illustrated in FIG. 19, the attribute information on the image sensors 10 (10*a* and 10*b*) and the electric devices 20 (the illumination devices L11 to L22) is assumed to be registered in the sensor DB 341 and the device DB 342. In this case, the installation position specifying unit 314 retrieves the layout information 343 of another room similar to the layout of the room in which the image sensors 10*a* and 10*b* and the illumination devices L11 to L22 are installed based on this layout. Here, in the case of FIG. 19, since two desks and eight illumination devices (four illumination devices thereof overlap) are present in the peripheries of the image sensors 10*a* and 10*b*, layout information 343 having the same layout which is illustrated in FIG. 23 and is similar to the layout is retrieved. Then, the installation position specifying unit 314 generates the attribute information on the image sensors 10 and the electric devices 20 included in the layout information of FIG. 23 using the attribute information on the image sensors 10*a* and 10*b* and the illumination devices L11 to L22 in FIG. 19.

Specifically, in the case of the layout illustrated in FIG. 23, the image sensor 10*a* in FIG. 19 corresponds to an image sensor 10*c* and the image sensor 10*b* in FIG. 19 corresponds to an image sensor 10*d*. Further, illumination devices L31 to L42 in FIG. 23 correspond to the illumination devices L11 to L22 in FIG. 19, respectively. Therefore, the installation position specifying unit 314 generates the attribute information on the image sensors 10*c* and 10*d* using the attribute information on the image sensors 10*a* and 10*b* and generates the attribute information on the illumination devices L31 to L42 using the attribute information on the illumination devices L11 to L22. Then, the installation position specifying unit 314 registers the attribute information generated for the image sensors 10*c* and 10*d* and the illumination devices L31 to L42 in the sensor DB 341 and the device DB 342.

Thus, in this modification example, since the attribute information on the image sensors 10 and the electric devices 20 with another layout similar to the layout can be generated using the attribute information generated for the image sensors 10 and the electric devices 20 having the specific layout, the attribute information can efficiently be generated.

Values different from the values assigned to the image sensors 10*a* and 10*b* and the illumination devices L11 to L22 are assumed to be assigned for the identification IDs or the IP addresses of the image sensors 10*c* and 10*d* and the illumination devices L31 to L42. Further, when the setting information is registered for the image sensors 10*a* and 10*b* and the illumination devices L11 to L22, this setting information may be useful for the image sensors 10*c* and 10*d* and the illumination devices L31 to L42.

In the above-described embodiment, the management terminal 30 has been configured to include the sensor DB 341 and the device DB 342, but the invention is not limited thereto. An external device (for example, a DB server or the like) which the management terminal 30 can access may be configured to include the sensor DB 341 and the device DB 342. In the above-described embodiment, the management terminal 30 has been configured to include the demand control unit 316 that performs the power controlling on the electric devices 20, but the invention is not limited thereto. An external device may be configured to include the demand control unit 316.

A program executed by the management terminal 30 according to the above-described embodiment is provided to be incorporated in advance into the storage medium (the ROM 32 or the storage unit 34) included in the management terminal 30, but the invention is not limited thereto. An installable or executable file may be recorded in a computer-readable recording medium such as a CD-ROM, a flexible disk (FD), a CD-R, or a DVD (Digital Versatile Disk) so as to be supplied. Further, the storage medium is not limited to a medium independent from a computer or an incorporated system, but an example of the storage medium may also include a storage medium that stores or temporarily stores a program delivered and downloaded via a LAN, the Internet, or the like.

Further, the program executed by the management terminal 30 according to the above-described embodiment may be stored on a computer connected to a network such as the Internet and downloaded via the network so as to be supplied. Alternatively, the program may be provided or distributed via a network such as the Internet.

The invention claimed is:

1. An information processing apparatus communicatively connected to an image sensor that is installed at the ceiling of a building, captures images of surroundings of a control target device which is to be a target of controlling and detects any one of presence/absence, a density and an amount of activity of people, comprising:
    an attribute information generation unit that generates, by using the images captured by the image sensor, attribute information of the control target device which is under jurisdiction of at least one of the image sensor;
    a management unit that manages the attribute information of the control target device generated by the attribute information generation unit in association with the control target device and the image sensor having jurisdiction over the control target device; and
    a demand control unit that controls the control target device based on any one of the presence/absence, density and amount of activity of people detected by the image sensor;
    wherein the attribute information generation unit detects an image in which a change occurs in accordance with powering on of the control target device from the images captured by the image sensor, and generates attribute information in which at least one of the image sensor that captured the image is associated with the powered-on control target device;

wherein the attribute information generation unit specifies a relative positional relationship of the powered-on control target device with respect to the image sensor from a state of the change in the detected image, and generates information representing the positional relationship as the attribute information;

wherein the attribute information generation unit divides an imaging range of the image sensor based on the specified relative positional relationship, and generates attribute information in which each of divided detection areas is associated with the control target device which belongs to the each of detection areas.

2. The information processing apparatus according to claim 1, further comprising a determination unit that determines whether the detection areas overlap each other between the image sensors based on identity of the control target device associated with the detection areas of the image sensors.

3. The information processing apparatus according to claim 2, further comprising an overlap resolution unit that assigns the control target device, which belongs to the each of detection areas determined to overlap by the determination unit, between the image sensors associated with the detection areas.

4. The information processing apparatus according to claim 2, further comprising an addition unit that adds instruction information, which indicates overlapping, to the detection areas of the respective image sensor determined to overlap by the determination unit.

5. The information processing apparatus according to claim 1, further comprising a storage unit that stores layout information indicating an arrangement position and a layout of each object including the control target device and the image sensor installed in each room, wherein the attribute information generation unit recognizes, from the images captured by the image sensor, the layout of the object included in the images, and generates arrangement positions of the control target device and the image sensor specified from the layout information similar to the recognized layout as the attribute information.

6. The information processing apparatus according to claim 5, wherein, by using the attribute information generated for the control target device and the image sensor of the specified layout, the attribute information generation unit generates attribute information of other control target device and other image sensor having layout similar to the specified layout.

7. An information processing apparatus communicatively connected to an image sensor that is installed at the ceiling of a building, captures images of surroundings of a control target device which is to be a target of controlling and detects any one of presence/absence, a density and an amount of activity of people, comprising:

an attribute information generation unit that generates, by using the images captured by the image sensor, attribute information of the control target device which is under jurisdiction of at least one of the image sensor;

a management unit that manages the attribute information of the control target device generated by the attribute information generation unit in association with the control target device and the image sensor having jurisdiction over the control target device; and a demand control unit that controls the control target device based on any one of the presence/absence, density and amount of activity of people detected by the image sensor;

wherein the attribute information generation unit detects an image in which a change occurs in accordance with powering on of the control target device from the images captured by the image sensor, and generates attribute information in which at least one of the image sensor that captured the image is associated with the powered-on control target device;

wherein, when the change cannot be detected from the image captured by the image sensor at the time of turning on the control target device, the attribute information generation unit generates attribute information in which the control target device is associated with other sensor device, after completing the generation of the attribute information of the image sensor.

8. An information processing method performed by an information processing apparatus communicatively connected to an image sensor that is installed at the ceiling of a building, captures images of surroundings of a control target device which is to be a target of controlling and detects any one of presence/absence, a density and an amount of activity of people, the method comprising:

generating, by an attribute information generation unit, attribute information of the control target device which is under jurisdiction of the image sensor by using the images captured by the image sensor;

managing, by a management unit, the attribute information of the control target device generated by the attribute information generation unit in association with the control target device and the image sensor having jurisdiction over the control target device; and controlling, by a demand control unit, the control target device based on any one of the presence/absence, density and amount of activity of people detected by the image sensor, wherein the attribute information generation unit detects an image in which a change occurs in accordance with powering on of the control target device from the images captured by the image sensor, and generates attribute information in which at least one of the image sensor that captured the image is associated with the powered-on control target device;

wherein the attribute information generation unit specifies a relative positional relationship of the powered-on control target device with respect to the image sensor from a state of the change in the detected image, and generates information representing the positional relationship as the attribute information;

wherein the attribute information generation unit divides an imaging range of the image sensor based on the specified relative positional relationship, and generates attribute information in which each of divided detection areas is associated with the control target device which belongs to the each of detection areas.

9. A computer program product having a non-transitory computer readable medium including programmed instructions, wherein the instructions, when executed by a computer of an information processing apparatus, which is communicatively connected to an image sensor that is installed at the ceiling of a building, captures images of surroundings of a control target device which is to be a target of controlling and detects any one of a presence/absence, a density and an amount of activity of people, cause the computer to perform:

generating, by the attribute information generation unit, attribute information of the control target device which is under jurisdiction of at least one of the image sensor by using the images captured by the image sensor;

managing the attribute information of the control target device generated by the generating in association with the control target device and the image sensor having jurisdiction over the control target device; and controlling, by a demand control unit, the control target device based on any one of the presence/absence, density and amount of activity of people detected by the image sensor, wherein the attribute information generation unit detects an image in which a change occurs in accordance with powering on of the control target device from the images captured by the image sensor, and generates attribute information in which at least one of the image sensor that captured the image is associated with the powered-on control target device;

wherein the attribute information generation unit specifies a relative positional relationship of the powered-on control target device with respect to the image sensor from a state of the change in the detected image, and generates information representing the positional relationship as the attribute information;

wherein the attribute information generation unit divides an imaging range of the image sensor based on the specified relative positional relationship, and generates attribute information in which each of divided detection areas is associated with the control target device which belongs to the each of detection areas.

10. An information processing method performed by an information processing apparatus communicatively connected to an image sensor that is installed at the ceiling of a building, captures images of surroundings of a control target device which is to be a target of controlling and detects any one of presence/absence, a density and an amount of activity of people, the method comprising:

generating, by an attribute information generation unit, attribute information of the control target device which is under jurisdiction of the image sensor by using the images captured by the image sensor;

managing, by a management unit, the attribute information of the control target device generated by the attribute information generation unit in association with the control target device and the image sensor having jurisdiction over the control target device; and controlling, by a demand control unit, the control target device based on any one of the presence/absence, density and amount of activity of people detected by the image sensor, wherein the attribute information generation unit detects an image in which a change occurs in accordance with powering on of the control target device from the images captured by the image sensor, and generates attribute information in which at least one of the image sensor that captured the image is associated with the powered-on control target device;

wherein, when the change cannot be detected from the image captured by the image sensor at the time of turning on the control target device, the attribute information generation unit generates attribute information in which the control target device is associated with other sensor device, after completing the generation of the attribute information of the image sensor.

11. A computer program product having a non-transitory computer readable medium including programmed instructions, wherein the instructions, when executed by a computer of an information processing apparatus, which is communicatively connected to an image sensor that is installed at the ceiling of a building, captures images of surroundings of a control target device which is to be a target of controlling and detects any one of a presence/absence, a density and an amount of activity of people, cause the computer to perform:

generating, by an attribute information generation unit, attribute information of the control target device which is under jurisdiction of at least one of the image sensor by using the images captured by the image sensor;

managing the attribute information of the control target device generated by the generating in association with the control target device and the image sensor having jurisdiction over the control target device; and controlling, by a demand control unit, the control target device based on any one of the presence/absence, density and amount of activity of people detected by the image sensor, wherein the attribute information generation unit detects an image in which a change occurs in accordance with powering on of the control target device from the images captured by the image sensor, and generates attribute information in which at least one of the image sensor that captured the image is associated with the powered-on control target device;

wherein, when the change cannot be detected from the image captured by the image sensor at the time of turning on the control target device, the attribute information generation unit generates attribute information in which the control target device is associated with other sensor device, after completing the generation of the attribute information of the image sensor.

* * * * *

UNITED STATES PATENT AND TRADEMARK OFFICE
CERTIFICATE OF CORRECTION

PATENT NO. : 9,442,553 B2  
APPLICATION NO. : 13/820034  
DATED : September 13, 2016  
INVENTOR(S) : Takaaki Enohara et al.

It is certified that error appears in the above-identified patent and that said Letters Patent is hereby corrected as shown below:

On the Title Page

After Abstract, insert --12 Claims, 18 Drawings--

In the Claims

Column 18, Line 51, add --Claim 12. The information processing apparatus according to claim 1, wherein the attribute information generation unit recognizes a predetermined character string included in the images captured by the image sensor, and generates the recognized character string as the attribute information.--

Signed and Sealed this  
Eighteenth Day of September, 2018

Andrei Iancu  
*Director of the United States Patent and Trademark Office*